Nov. 27, 1923.
W. H. GREEN
FILTER
Filed May 31, 1921
1,475,577
2 Sheets-Sheet 2
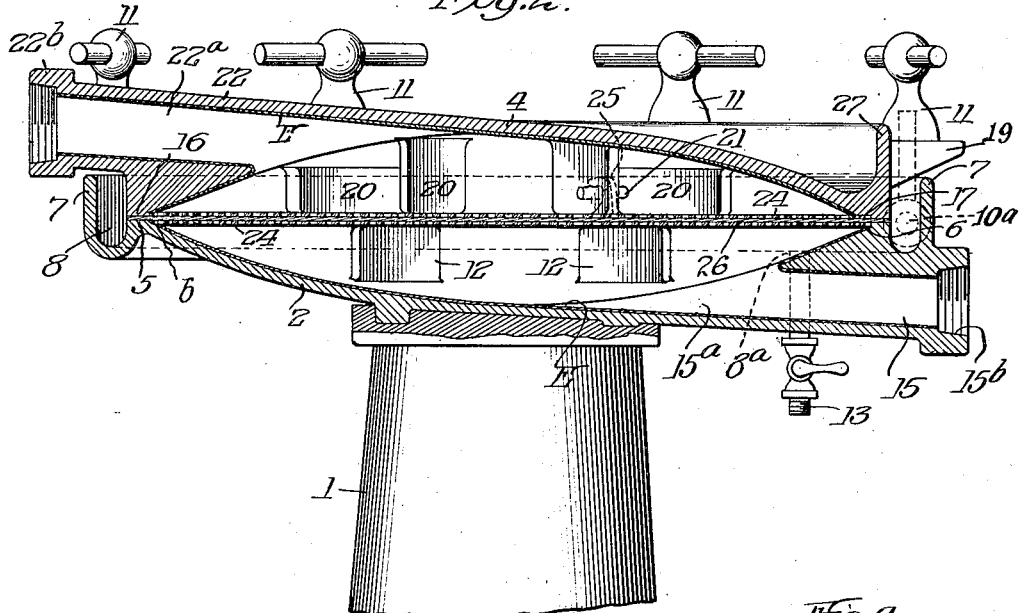
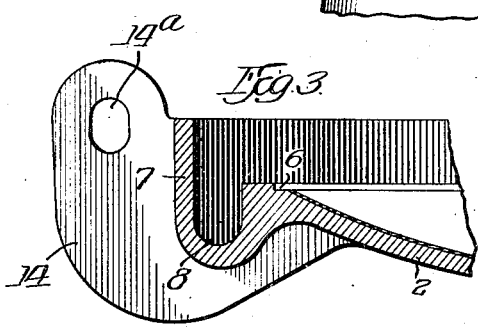
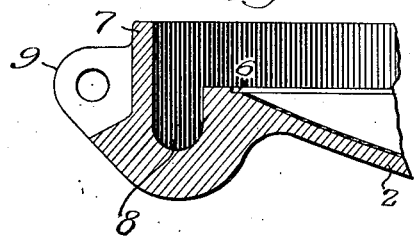
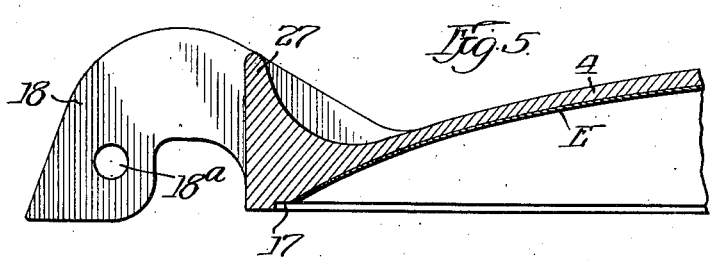
Witness:
Geo. C. Davison
Inventor
Walter H. Green,
By Cromwell, Greist & Warden
Attys.

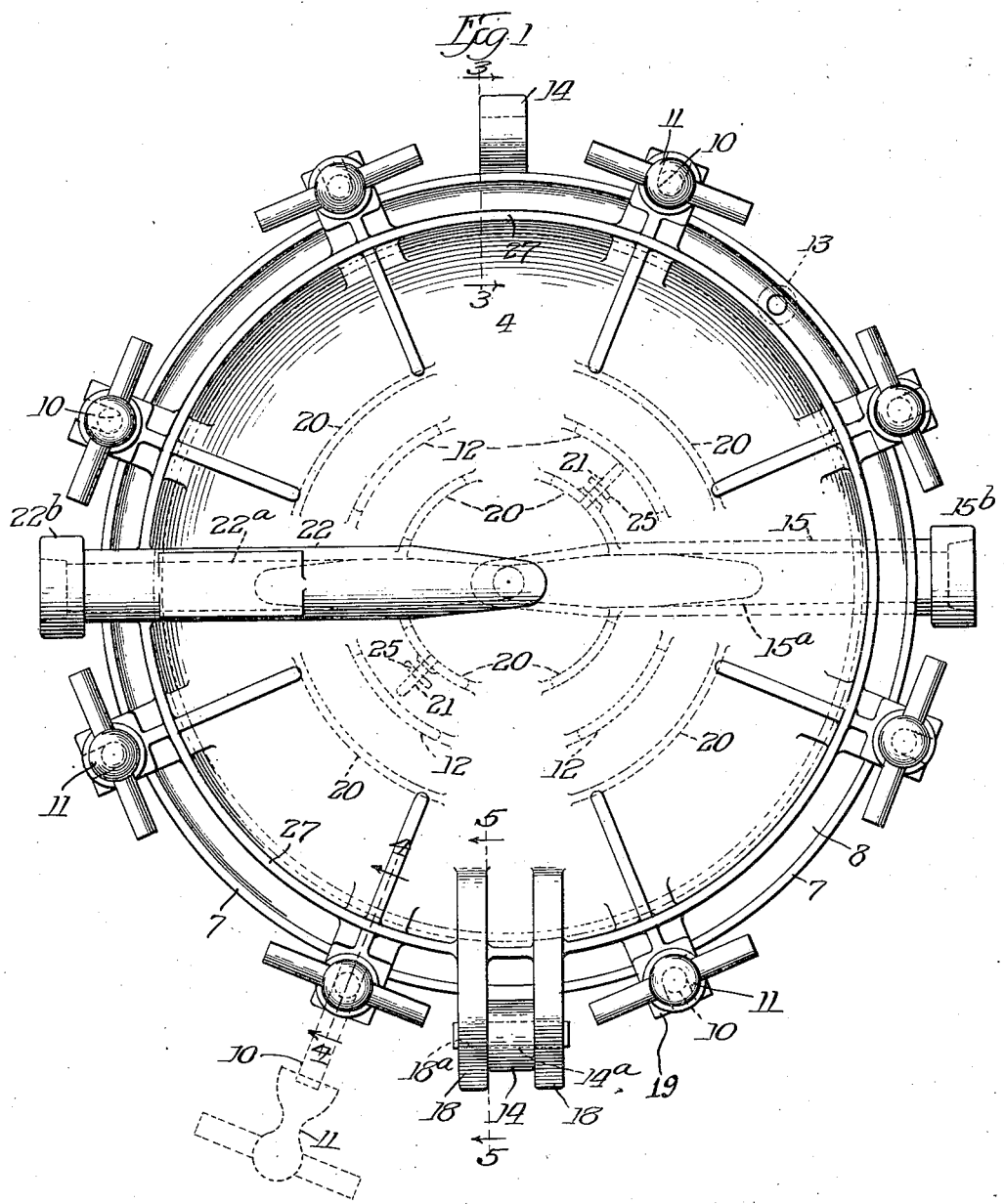

Patented Nov. 27, 1923.

1,475,577

UNITED STATES PATENT OFFICE.

WALTER H. GREEN, OF CHICAGO, ILLINOIS, ASSIGNOR TO INTERNATIONAL FILTER CO., OF CHICAGO, ILLINOIS, A CORPORATION OF ILLINOIS.

FILTER.

Application filed May 31, 1921. Serial No. 473,611.

*To all whom it may concern:*

Be it known that I, WALTER H. GREEN, a citizen of the United States, residing at Chicago, in the county of Cook and State of Illinois, have invented certain new and useful Improvements in Filters, of which the following is a specification.

This invention relates to filters, particularly to filters of the disk type. The general object of the present invention is the provision of an improved filter of the type specified which is adapted to handle efficiently both large and small quantities of liquid, and which is adapted to facilitate cleaning of the apparatus and renewal of the filtering medium.

A particular object of the invention is the provision of a filter having these attributes, and in which loss of the handled liquid, incident either to the operation of the apparatus or to the opening thereof for cleansing or replacement of the filtering medium, is provided.

Another particular object of the invention is the provision of a structure which enables rapid and complete drainage of the apparatus when desired, and conservation of the liquid which is drawn off.

A still further object of the invention is the provision of a structure designed to permit the handling of the liquid under high pressure without loss thereof.

Another particular object is the provision of a filter in which the construction and arrangement of parts is such as to enhance the convenience of assembly and attachment of connections for conducting the handled liquid.

Yet another object of the invention is the provision of a filter construction which is especially qualified for the handling of liquids which it is desirable to keep sterile.

Another particular object is the provision of a filter construction in which the portions with which the handled liquid comes into contact may be enamelled, the characteristic features of the device being such as to facilitate the application of the enamelled finish and conduce to its preservation while maintaining the desired structural form of the parts subjected to the enameling treatment.

A further object is an improved construction which will obtain the advantages specified above, and at the same time be of materially less weight than filters of this type now in use, and therefore susceptible of more convenient and rapid manipulation.

Still further objects of the invention reside in the particular combinations and arrangements of parts and features of construction hereinafter described, and other objects will be pointed out hereinafter, indicated in the appended claims, or obvious upon an understanding of the present disclosure.

In the accompanying drawings forming a part of the specification I have shown what I now regard as a preferred embodiment of the invention, but it is to be understood that this single form is here presented for the purpose of illustration solely, and is not to be considered as an intended limitation of what I hereinafter claim as my invention, short of its true and most comprehensive scope.

In the drawings,

Fig. 1 is a top or plan view of the filter,

Fig. 2 is a sectional elevation on a diameter of the casing,

Fig. 3 is a detail in the nature of a vertical section approximately on the line 3—3 of Fig. 1, Fig. 4 is a detail in the nature of a vertical section on the line 4—4 of Fig. 1, and Fig. 5 is a detail in the nature of a vertical section on the line 5—5 of Fig. 1.

The nature of the invention will best be understood by reference to the drawings in detail, in which it will be understood that the numeral 1 designates a suitable pedestal or support for the filter casing. The filter casing is made up of a base member 2 and a closure member 4, which preferably are of general circular outline, being preferably formed as metallic castings of dished or lenticular contour whereby they constitute receptacles. The base member has an annular junction flange 5, the surface of which lies in a common plane, and adjacent the junction flange the material is shaped to provide an annular grid seat or recess 6. Formed integrally as a part of the base member is an upstanding annular collecting flange 7 encompassing the junction flange 5, extending a substantial distance above the same, and spaced apart therefrom so as to afford an intervening annular channel 8. This channel I will designate as a drip channel. The channel is tapped at the bottom, as at 8ª and fitted with a drain conduit 13, through which liquid may be drawn off from the channel. Extending radially out beyond the flange 7 and disposed at intervals about the periphery of the base member are the clamp mountings 9 formed on flanges integral with the flange 7 and the body of the base member. The form of said flanges is shown in Fig. 4. Each of the clamp supports forms a hinge mounting for a clamp bolt 10 secured to the support by a pin 10ª, the arrangement being such that the bolt may be swung to an upright position or to a radially extended position. Each clamp bolt carries a clamping head 11 having screw thread engagement therewith, and adapted for manual operation. Within the concave or dished portion of the member 2 is a plurality of interspaced grid supports 12, the upper margins of which lie in the plane of the bottom of the grid seat 6. Formed at diametrically opposite sides of the base member are the hinge arms 14, which extend radially beyond the collecting flange 7. These hinge arms are pierced transversely as at 14ª to provide seats for a hinge bolt, said seats being elongated vertically to permit vertical displacement of the hinge bolt therein. An inlet conduit 15 is formed on the base member and extends laterally between the hinge arms 14, which conduit has communication with the cavity of the base member through aperture 15ª which extends a substantial distance across the width of the latter and taps the cavity at its deepest portion. The inlet conduit terminates in a junction boss 15ᵇ which is adapted for the attachment of a supply line, and the longitudinal bore of the inlet conduit is inclined so as to give an appreciable fall from the bottom of the cavity of the base member to the termination of the junction boss.

The closure member 4 is shaped to form a complementary closure for the cavity of the base member. Like the latter it is formed with an annular junction flange 16 on the same radius as the junction flange 5, and within and adjacent said flange 16 the closure member is formed to provide a depressed grid seat 17. Radially extending webs 18 which project beyond the margin of the closure member constitute hinge arms adapted for cooperation with either of the hinge arms 14 on the base member, and are provided with transverse apertures 18ª for reception of the hinge bolt. Arranged at such intervals as to register with the clamp supports 9 when the hinge arms 18 are connected to either of the hinge arms 14, are provided radially extending clamping lugs 19 formed on webs integral with the material of the closure member. These lugs have radially open slots into and out of which the clamp bolts 10 may be swung. These lugs are adapted to engage under the screw heads 11, so that when the latter are screwed down on the bolts 10, pressure will be exerted upon the closure member to force it toward the base member. Depending from the inner wall of the cavity of the closure member is a plurality of interspaced grid spacers 20. These are shown arranged in concentric series at different radial distances than the supports 12 from the axis of the base and closure members, but it is obvious that other arrangements may be employed. Seated in certain of the inner grid supports are radially extending pins 21. Formed integrally on top of the closure member is an outlet conduit 22 which extends at an angle relative to the diameter on which the hinge arm 18 lies. The outlet conduit 22 has communication with the cavity of the closure member through an aperture 22ª which preferably extends a substantial distance across the width of the closure member, the bore of said conduit entering the cavity of the closure member at its deepest point and emerging therefrom to the point where it passes through the junction boss 22ᵇ. The latter is adapted for the connection of a pipe through which liquid may be discharged or drawn off from the filter.

Disposed in the grid seats 6 and 17 are the disk supporting grids 24. These grids are stiff foraminous structures, either perforated metal or strong mesh. The lower grid is held in the seat 16 by gravity, while the upper grid is retained in position on the closure member by locks 25 which are adapted to engage the pins 21 to hold the grid in place, rotation of the grid being effective to disengage them and permit removal of the grid. The supports 12 and spacers 20 contact the respective grids and operate to sustain them against flexing toward the members on which they are mounted. Between the grids is disposed one or a plurality of filter disks 26. These disks are of proper shape and size to overlap the junction flanges 16 and 5, permitting a close clamping of such disks between said flanges. These disks preferably are made of compressed cotton fiber or other pervious material suitable to function as very fine filtering or straining media.

The inner surfaces of the base and closure members preferably are provided with a coating of enamel designated E, the same being applied to the surfaces of all parts within or communicating with said cavities including the grid supports and the walls of the bores of the inlet and outlet conduits. As is well known in the art, in the application of enamel, the object to which it is applied is heated to a temperature sufficiently high to flux the enameling material, which usually is a vitreous substance. The enameling material is then dusted or distributed on the intended surface of the heated object, and is fluxed into a continuous impervious coating. Incident to this enameling operation, there is possibility of changes in the structural form of the heated metallic object, due to warping, and this is particularly likely to happen in the case of articles of extended shape and thin structure such as the members 2 and 4. It is important therefore that provision be made in said members to inhibit as far as possible the warping effect. This is accomplished in the case of the base member 2 by the flange 7, which by virtue of its integrity with the base member and its disposal in relationship to the junction seat 5 withstands warping strains which would tend to distort the junction flange and the grid seat out of their proper form. In the case of the closure member 4, the structure is provided with an integral annular flange 27 which is cast on top of the member substantially over the junction flange 16. This flange 27 similarly restrains the closure member against distortion in the portions at the junction flange where proper shape is essential to secure the desired relationship of parts in the assembly of the device.

In operation of the device, the parts being assembled as above described, the closure member securely clamped upon the base member, and the inlet and outlet conduits being connected respectively with the desired supply and discharge lines, the liquid to be filtered is introduced into the base member under pressure, finding access into the cavity thereof through the aperture 15$^a$ below the grids and filter disk. Due to the extent of the aperture 15$^a$ the liquid is introduced at substantially uniform rate throughout the width of the cavity, passes through the lower grid, filters through the disk, and then passes through the upper grid into the cavity of the closure member. Thence it is withdrawn through the outlet conduit 22. In passage of the liquid through the disk, the suspended matter is caught by the fibers of the latter and retained, thus clarifying the liquid of such matter. When a disk has gathered an accumulation of such foreign matter it is removed and replaced by an uncontaminated disk. As stated above, the margin of the disk constitutes packing between the junction flanges of the casing members, the elongated form of the bolt aperature 14$^a$ permitting the necessary play between the casing members to allow for different thicknesses of disks. Due to the essentially pervious nature of the disk, however, there may be a certain amount of lateral leakage through the portions between the junction flanges, particularly when relatively high pressures are employed upon the liquid. It will be observed that the collecting flange 7 extends upwardly across the margin of a disk in position between the casing members, so that such liquid as escapes between the latter is caught by said flange and conserved in channel 8, whence it is withdrawn through the drain pipe 8$^a$. Waste of the liquid is thus prevented. It is obvious that there will be an amount of liquid retained in the casings after cessation of operation. In so far as the unfiltered component of this liquid is concerned, it being in the cavity of the base member below the disk, it will be withdrawn through the inlet conduit 15, the fall in the latter and its communication with said cavity permitting the cavity to be completely cleared by natural drainage through said conduit. Upon the loosening of the clamping means the filtered component of the retained liquid will be permitted to discharge from the cavity of the closure member into the channel 8, whence it may be withdrawn through the pipe 8$^a$ without waste and without being permitted to mingle with unfiltered liquid. The clamping means being disengaged from the lugs 19, the closure member may be swung to open position, permitting removal of the disk and the grids, leaving the casing completely open. In this position it may be quickly and thoroughly flushed out and cleansed and rendered antiseptic. With the parts in this position both the inlet and the outlet conduits afford channels for free and unrestricted drainage of cleansing fluid from the cavity portions.

The relationship of the inlet and outlet conduits to the hinge arms is of material importance in facilitating the opening and cleansing of the device and also in adapting it for connection with the supply and discharge lines and the like. Due to the fact that these conduits extend at an angle to the diameter on which the hinge arms lie, the closure member may be disposed so that the outlet conduit will extend either in the same direction as the inlet conduit or in the opposite direction, while the casing may be opened without necessitating detachment of the connections to said conduits when flexible connections are utilized. Due to the dome shape or lenticular form of the cavities in the base member and the closure member, and due to the fact that the inlet and outlet apertures enter said cavities at their deepest points, it is impossible for air to be trapped anywhere within the device, and as a result the entire efficiency of the filtering disk may be employed irrespective of whether the pressure upon the incoming liquid is high or low. The mounting of the clamp supports 9 and clamping lugs 19 upon the peripheral stiffening flanges 7 and 27, respectively, transmits the clamping pressures directly through the latter to the junction flanges 5 and 16, the height of the flanges 7 and 27 providing inflexible stays which will positively prevent any deflection in the casing members from the clamping pressures. This eliminates the necessity for heavy bracing flanges extending across the tops of the casing members, as has been the customary practice heretofore. It is to be observed further that the construction places the hinge mountings of the members 11 completely outside the channel 8 so that the clamp screws 11 are operated entirely outside the area of the channel. This arrangement is of importance in that it prevents the fowling or wetting of the clamp screws and their hinges by liquid which escapes from between the margins of the casing members, and it also prevents foreign material falling from the clamping screws or their hinges into the channel 8 incident to the tightening or loosening of the clamps. A filter containing these improved features of construction, while adapted to general use, is of particular utility in the handling of valuable liquids, because of the fact that the entire apparatus may be cleared of liquid without involving loss thereof. The filter adapts itself also particularly to the handling of corrosive liquids, or sterile organic liquids such as milk, as the structure is adapted for the reception and preservation of a complete enamel surface coating for the casing and grids, and permits the complete and rapid cleansing of all surfaces with which the handled liquid may come in contact.

I claim:

1. In a filter of the class described the combination of casing members formed with cavities for the confining of fluid, said casing members being provided about said cavities and within said cavities with supporting members for sustaining a sheet of filtering material, said casing members being provided with means affording inlet and outlet conduits each having communication with said cavities on opposite sides of the supports therewithin.

2. In a filter the combination of a pair of mating casing members formed with internal cavities for reception of liquid and adapted to engage an intervening sheet of filtering material, one of said members being provided with oppositely disposed hinge supports, the other of said casing members being provided with a hinge arm adapted for cooperation with either of said hinge supports to maintain the cavities of said members in register, means for clamping the casing members in assembled relationship, and outlet conduits on such casing members affording communication with their cavities, said conduits including connection portions disposed laterally of the casing members between the hinge supports.

3. In a filter, casing members of dished form affording concavities for reception of fluid, circumferentially extending supporting members disposed in said concavities for supporting a filtering medium, and means on the casing members affording radially extending inlet and outlet conduits each communicating with the concavities on opposite sides of the supporting members.

4. In a filter, in combination, dished casing members affording concavities for confining a fluid, said casing members being provided with circumferentially extending clamping flanges adapted for cooperation to engage the marginal portion of a filter disk, circumferentially extending supporting members on the casing members within their concavities, said supporting members on the two casing members cooperating to clamp the filter disk between them, said casing members being provided with conduits extending radially across the supporting members so as to have communication directly with spaces between them.

5. In a filter, in combination, dish like casing members provided with concavities for confinement of fluid, said casing members being provided with junction flanges encompassing their concavities and arranged for cooperation to engage a filter disk, peripheral stiffening flanges formed on the casing members integrally with the junction flanges and arranged in parallel relationship, radially extending lugs formed on said stiffening flanges and projecting outwardly therefrom, and clamping means engaging said lugs, whereby pressures may be exerted through the peripheral stiffening flanges to compress material between the junction flanges.

6. In a filter, in combination, dish like casing members provided with concavities for confinement of liquid, said casing members being provided with clamping portions encompassing their concavities and adapted for cooperation to engage a filter disk, one of said casing members being provided with an upstanding peripheral flange spaced outwardly from the periphery of the other casing member to afford an intervening channel, said other casing member being provided with radially extending lugs projecting across the periphery of the first mentioned casing member above said channel, and clamping means engaging said lugs and said first mentioned casing member beyond the periphery of said flange.

7. In a filter, in combination, casing members of dished form and generally circular contour, said casing members being formed with concavities for confinement of fluid, one of said members being provided with diametrically extending hinge arms, the other casing member being provided with a radially extending hinge arm adapted for connection to either of the hinge arms on the first casing member, whereby to connect the casing members for swinging movement, said casing members being provided with radially extending conduit portions affording communications with their concavities, lugs formed on the casing members for alignment when the hinge arms are connected, and clamping means cooperating with said lugs to maintain the casing members in cooperative disposal.

In testimony whereof I have hereunto subscribed my name in the presence of two subscribing witneses.

WALTER H. GREEN.

Witnesses:
B. ENGEL,
A. B. HODGES.